US012722518B2

(12) United States Patent
Shin et al.

(10) Patent No.: US 12,722,518 B2
(45) Date of Patent: Sep. 1, 2026

(54) APPARATUS AND METHOD FOR CONTROLLING CHARGING OF MOBILITY

(71) Applicants: Hyundai Motor Company, Seoul (KR); Kia Corporation, Seoul (KR)

(72) Inventors: Jae Dong Shin, Hwaseong-si (KR); Yong Kyu Yoo, Yongin-si (KR); Ho Kwon Na, Dangjin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 690 days.

(21) Appl. No.: 18/189,555

(22) Filed: Mar. 24, 2023

(65) Prior Publication Data

US 2024/0157833 A1 May 16, 2024

(30) Foreign Application Priority Data

Nov. 10, 2022 (KR) ........................ 10-2022-0149686

(51) Int. Cl.

*B60L 53/62* (2019.01)
*H02J 7/61* (2026.01)
*H02J 7/80* (2026.01)
*H02J 7/96* (2026.01)

(52) U.S. Cl.

CPC ................ *B60L 53/62* (2019.02); *H02J 7/61* (2026.01); *H02J 7/80* (2026.01); *H02J 7/96* (2026.01); *B60L 2200/12* (2013.01); *B60L 2200/16* (2013.01); *B60L 2240/547* (2013.01); *B60L 2240/549* (2013.01)

(58) Field of Classification Search

CPC ...................................................... B60L 53/62

USPC .......................................................... 320/109

See application file for complete search history.

(56) References Cited

U.S. PATENT DOCUMENTS

2011/0215770 A1* 9/2011 Belz ...................... H02J 7/0068 320/160

2016/0181830 A1* 6/2016 Matsumura ............. G06F 1/263 713/300

FOREIGN PATENT DOCUMENTS

| | | | | |
|---|---|---|---|---|
| CN | 106026301 A | | 10/2016 | |
| CN | 106160092 A | | 11/2016 | |
| CN | 108988450 A | | 12/2018 | |
| CN | 109143096 A | | 1/2019 | |
| CN | 209200734 U | * | 8/2019 | ............. Y02T 10/70 |
| CN | 111884291 A | * | 11/2020 | ........ H02J 7/007182 |
| JP | 2015154661 A | | 8/2015 | |
| KR | 100264864 B1 | | 9/2000 | |
| KR | 20180049588 A | | 5/2018 | |

* cited by examiner

*Primary Examiner* — Jerry D Robbins

(74) *Attorney, Agent, or Firm* — Slater Matsil, LLP

(57) ABSTRACT

An embodiment apparatus for controlling charging of a mobility includes a sensor configured to measure a battery voltage of a battery of the mobility to which a reference current is input and a controller configured to determine a rated voltage of the battery according to whether an amount of change in the battery voltage exceeds a reference value and to set a charging voltage corresponding to the rated voltage based on a determination that the battery voltage exceeds a first threshold value and is less than a second threshold value.

20 Claims, 8 Drawing Sheets

APPARATUS AND METHOD FOR CONTROLLING CHARGING OF MOBILITY

CROSS-REFERENCE TO RELATED APPLICATIONS

This application claims the benefit of Korean Patent Application No. 10-2022-0149686, filed on Nov. 10, 2022, which application is hereby incorporated herein by reference.

TECHNICAL FIELD

The present disclosure relates to an apparatus and method for controlling charging of a mobility.

BACKGROUND

Recently, the prevalence of various types of mobilities (an electric kickboard, an electric bicycle, an electric scooter, and the like) has been expanded, but the expansion of common chargers is insufficient, so users are still charging using separate chargers for each type of mobility.

Accordingly, in order to increase user convenience and facilitate charging of mobilities, a technology for charging various types of batteries of the mobility with an electric vehicle charger or the development of a common charging station for various types of mobilities that supports charging of the mobilities such as an electric vehicle charging station has been demanded.

Because the batteries of different mobility have different rated voltages, in order to charge the batteries of various types of mobility using one charger or using a common charging station for the various types of mobilities, the voltage of the battery is measured to determine the rated voltage of each mobility battery. However, because the battery voltage measured when the battery of a first mobility is fully charged and the battery voltage measured when the battery of a second mobility is discharged may be the same according to temperature, lifespan, and state of charge (SOC), it is difficult to determine the rated voltage of each mobility battery only by measuring the voltage of the battery. For this reason, when the rated voltage of the battery is incorrectly determined and overcharged with an overvoltage, the battery may explode and cause a fire.

SUMMARY

Embodiments of the present disclosure can solve problems occurring in the prior art while advantages achieved by the prior art are maintained intact.

An embodiment of the present disclosure provides an apparatus and method for controlling charging of a mobility that can accurately determine the rated voltage of a battery of the mobility and charge various types of batteries of different mobilities through one charger.

Another embodiment of the present disclosure provides an apparatus and method for controlling charging of a mobility capable of safely charging a battery of a mobility by setting a charging voltage corresponding to a rated voltage.

Still another embodiment of the present disclosure provides an apparatus and method for controlling charging of a mobility capable of being applied to a common charging station for mobilities to improve user convenience and facilitates battery charging of mobilities.

The technical problems solvable by embodiments of the present disclosure are not limited to the aforementioned problems, and any other technical problems not mentioned herein will be clearly understood from the following description by those skilled in the art to which the present disclosure pertains.

According to an embodiment of the present disclosure, an apparatus for controlling charging of a mobility includes a sensor that measures a battery voltage of the mobility to which a reference current is input and a controller that determines a rated voltage of a battery according to whether an amount of change in the battery voltage exceeds a reference value and sets a charging voltage corresponding to the rated voltage when determining that the battery voltage exceeds a first threshold value and is less than a second threshold value.

According to an embodiment, the controller may determine that a battery having a rated voltage exceeding the second threshold value is in a discharged state when determining that the amount of change in the battery voltage exceeds the reference value.

According to an embodiment, the controller may determine that a battery having a rated voltage less than the first threshold value is in a charged state when determining that the amount of change in the battery voltage does not exceed the reference value.

According to an embodiment, the controller may calculate a cross voltage between a first voltage distribution of a first mobility and a second voltage distribution of a second mobility adjacent to the voltage distribution of the first mobility, set a minimum value in a specified range including the cross voltage as the first threshold value, and set a maximum value in the specified range as the second threshold value.

According to an embodiment, the voltage distribution of the first mobility may be set according to a range in which a rated voltage of the first mobility varies according to at least one of an external temperature, a lifespan of the battery, a charge amount of the battery, and a combination thereof.

According to an embodiment, the voltage distribution of the second mobility may be set according to a range in which a rated voltage of the second mobility varies according to at least one of an external temperature, a lifespan of the battery, a charge amount of the battery, and a combination thereof.

According to an embodiment, the reference current may have a value less than a current required for charging the battery.

According to an embodiment, the controller may set a preset voltage to the charging voltage to prevent the battery from being overcharged.

According to an embodiment, the controller may control charging of the battery based on the charging voltage.

According to an embodiment, the mobility may include a device that is moved by power generated by electric power output from the battery.

According to another embodiment of the present disclosure, a method of controlling charging of a mobility includes measuring, by a sensor, a battery voltage of the mobility to which a reference current is input, and determining, by a controller, a rated voltage of a battery according to whether an amount of change in the battery voltage exceeds a reference value and setting a charging voltage corresponding to the rated voltage when determining that the battery voltage exceeds a first threshold value and is less than a second threshold value.

According to an embodiment, the method may further include determining, by the controller, that a battery having a rated voltage exceeding the second threshold value is in a discharged state when it is determined that the amount of change in the battery voltage exceeds the reference value.

According to an embodiment, the method may further include determining, by the controller, that a battery having a rated voltage less than the first threshold value is in a charged state when it is determined that the amount of change in the battery voltage does not exceed the reference value.

According to an embodiment, the method may further include calculating, by the controller, a cross voltage between a first voltage distribution of a first mobility and a second voltage distribution of a second mobility adjacent to the voltage distribution of the first mobility, setting a minimum value in a specified range including the cross voltage as the first threshold value, and setting a maximum value in the specified range as the second threshold value.

According to an embodiment, the method may further include setting, by the controller, the voltage distribution of the first mobility according to a range in which a rated voltage of the first mobility varies according to at least one of an external temperature, a lifespan of the battery, a charge amount of the battery, and a combination thereof.

According to an embodiment, the method may further include setting, by the controller, the voltage distribution of the second mobility according to a range in which a rated voltage of the second mobility varies according to at least one of an external temperature, a lifespan of the battery, a charge amount of the battery, and a combination thereof.

According to an embodiment, the reference current may have a value less than a current required for charging the battery.

According to an embodiment, the method may further include setting, by the controller, a preset voltage as the charging voltage to prevent the battery from being overcharged.

According to an embodiment, the method may further include controlling, by the controller, charging of the battery based on the charging voltage.

According to an embodiment, the mobility may include a device that is moved by power generated by electric power output from the battery.

BRIEF DESCRIPTION OF THE DRAWINGS

The above and other objects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Figure 1:
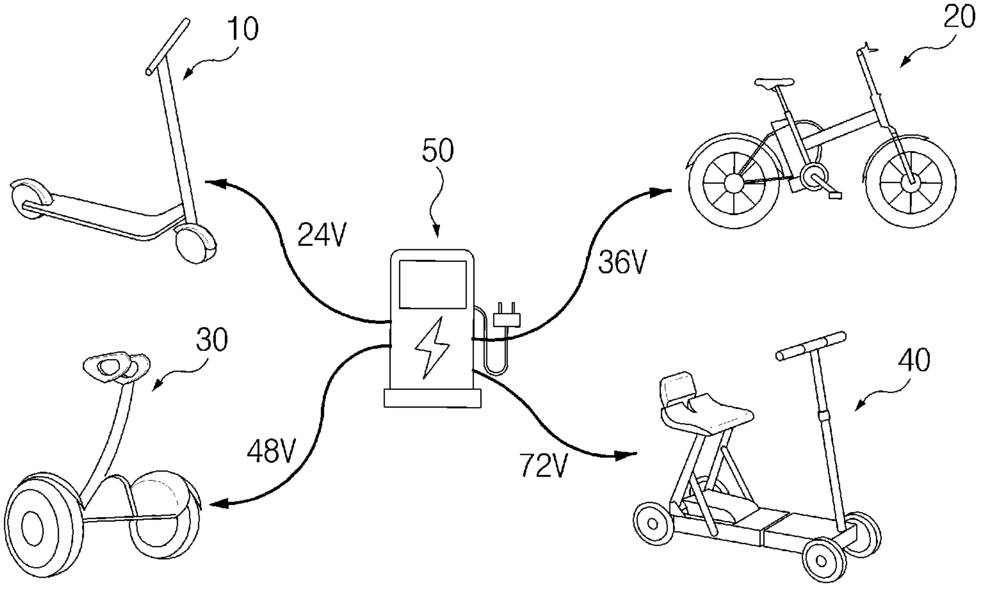
FIG. 1 is a diagram illustrating an apparatus for controlling charging of mobilities according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiments of the present disclosure, a detailed description of the related known configuration or function will be omitted when it is determined that it interferes with the understanding of the embodiments of the present disclosure.

In describing the components of the embodiments according to the present disclosure, terms such as first, second, A, B, (a), (b), and the like may be used. These terms are merely intended to distinguish the components from other components, and the terms do not limit the nature, order, or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

An apparatus for controlling charging of mobilities according to an embodiment of the present disclosure may be applied to one charger or a common mobility charger capable of charging various types of mobilities.

FIG. 1 is a diagram illustrating an apparatus for controlling charging of mobilities according to an embodiment of the present disclosure.

As shown in FIG. 1, according to an embodiment of the present disclosure, when applied to a common mobility charger, an apparatus for controlling charging of mobilities may charge mobilities s of various voltages. According to an embodiment, a common mobility charger “A” to which an apparatus for controlling charging of mobilities is applied may charge an electric kickboard 10 at a voltage of 24 V, charge an electric bicycle 20 at a voltage of 36 V, charge an electric board 30 at a voltage of 48 V, or charge an electric scooter 40 at a voltage of 72 V.

According to an embodiment, the mobility may include a device that is moved by power generated by electric power output from a battery. For example, the mobility may include an electric kickboard, an electric bicycle, an electric scooter, an electric board, an autonomous delivery robot, and a guide robot. According to an embodiment, an apparatus for controlling charging of mobilities may control wirelessly or wired charging of a battery. Hereinafter, an apparatus for controlling charging of mobilities according to an embodiment of the present disclosure will be described in more detail with reference to FIG. 2.

Figure 2:
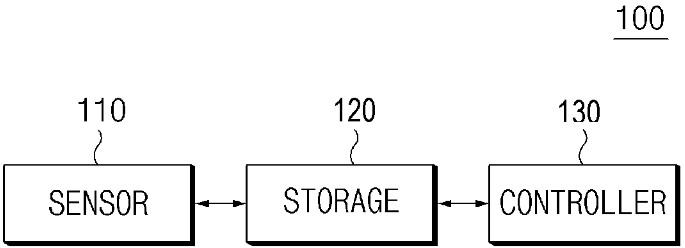
FIG. 2 is a block diagram illustrating the configuration of an apparatus for controlling charging of mobilities according to an embodiment of the present disclosure.

FIG. 2 is a block diagram illustrating the configuration of an apparatus for controlling charging of a mobility according to an embodiment of the present disclosure.

As shown in FIG. 2, an apparatus 100 for controlling charging of a mobility may include a sensor no, a memory (i.e., a storage) 120, and a controller 130.

The sensor no may detect a battery state of a mobility. According to an embodiment, the sensor no may include a voltage sensor for measuring the voltage of a battery and a current sensor for measuring the current of the battery.

The memory 120 may store at least one algorithm for performing calculation or execution of various commands for operation of an apparatus for controlling charging of mobilities s according to an embodiment of the present disclosure. The memory 120 may include at least one storage medium of a flash memory, a hard disk, a memory card, a read-only memory (ROM), a random access memory (RAM), a programmable ROM (PROM), an electrically erasable PROM (EEPROM), a magnetic memory, a magnetic disk, and an optical disk.

The controller 130 may be implemented with various processing devices such as a microprocessor and the like in which a semiconductor chip capable of performing operations or executions of various commands is built-in and may control operations of a vehicle control apparatus according to an embodiment of the present disclosure. The controller 130 may be electrically connected to the sensor no and the memory 120 through a wired cable or various circuits to transmit an electrical signal including a control command and the like and may transmit/receive an electrical signal including a control command and the like through various wireless communication networks such as a controller area network (CAN).

The controller 130 may determine whether the battery of the mobility is connected. In this case, the connection may include a wireless connection or a wired connection. The wireless connection may include electrical connection in which the battery of the mobility is attached to a specified wireless charging pad, and the wired connection may include electrical connection of the battery of the mobility through a wired charging cable.

When it is determined that the battery of the mobility is connected, the controller 130 may control a reference current to be input to the battery. In this case, the reference current may mean a current having a value less than the current required for charging the battery. According to an embodiment, the reference current may include a minute current of 0.5 A.

The controller 130 may control the sensor no to measure the voltage of a battery to which a reference current is input. The controller 130 may determine the voltage of the battery measured by the sensor no.

The controller 130 may determine whether the voltage of the battery exceeds a first threshold value and is less than a second threshold value. According to an embodiment, the controller 130 may calculate a cross voltage between a voltage distribution of a first mobility and a voltage distribution of a second mobility adjacent to the voltage distribution of the first mobility, set the minimum value in a specified range including the cross voltage as the first threshold value, and set the maximum value in the specified range as the second threshold value. For a more detailed description, refer to FIG. 3.

Figure 3:
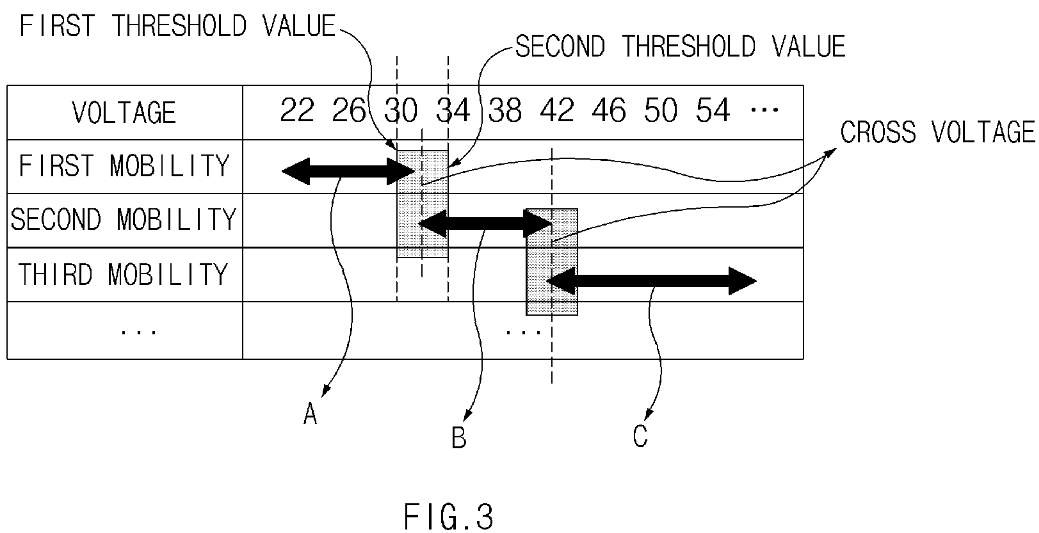
FIG. 3 is a diagram schematically illustrating a voltage distribution according to mobility types according to an embodiment of the present disclosure.

FIG. 3 is a diagram schematically illustrating a voltage distribution according to mobility types according to an embodiment of the present disclosure.

As shown in FIG. 3, the controller 130 may set the voltage distribution in a range that the rated voltage of the mobility (first mobility, second mobility, third mobility . . . ) to be charged varies according to one of an external temperature, a lifespan of the battery, a charge amount of the battery, and a combination thereof.

According to an embodiment, when the rated voltage of the first mobility is 24 V, the controller 130 may set the voltage distribution "A" of the first mobility to a first range (e.g., 22 V to 32 V). In addition, when the rated voltage of the second mobility is 36 V, the controller 130 may set the voltage distribution "B" of the second mobility to a second range (e.g., 32 V to 42 V). In addition, when the rated voltage of the third mobility is 48 V, the controller 130 may set the voltage distribution "C" of the third mobility to a third range (e.g., 42 V to 56 V).

The controller 130 may calculate a cross voltage between the voltage distribution "A" of the first mobility and the voltage distribution "B" of the second mobility having a voltage distribution adjacent to the voltage distribution A of the first mobility. According to an embodiment, the cross voltage between the voltage distribution "A" of the first mobility and the voltage distribution B of the second mobility may be calculated as about 32 V.

The controller 130 may set a specified range including the cross voltage and may set the minimum value in a specified range as the first threshold value and the maximum value in the specified range as the second threshold value.

When it is determined that the measured voltage value of the battery to which the reference current is input exceeds the first threshold value and is less than the second threshold value, the controller 130 may not determine whether the battery whose voltage is measured is a battery of the first mobility or the second mobility.

That is, because the section exceeding the first threshold value and being less than the second threshold value is included in the voltage distribution of the first mobility and also is included in the voltage distribution of the second mobility, the controller 130 cannot determine the rated voltage of the battery only based on the measured voltage.

According to an embodiment of the present disclosure, the controller 130 determines whether the amount of change in the battery voltage exceeds the reference value when the measured voltage value of the battery to which the reference current is input exceeds the first threshold value and is less than the second threshold value. A configuration in which the controller 130 determines whether the amount of change in the battery voltage exceeds the reference value will be described in detail with reference to FIG. 4.

Figure 4:
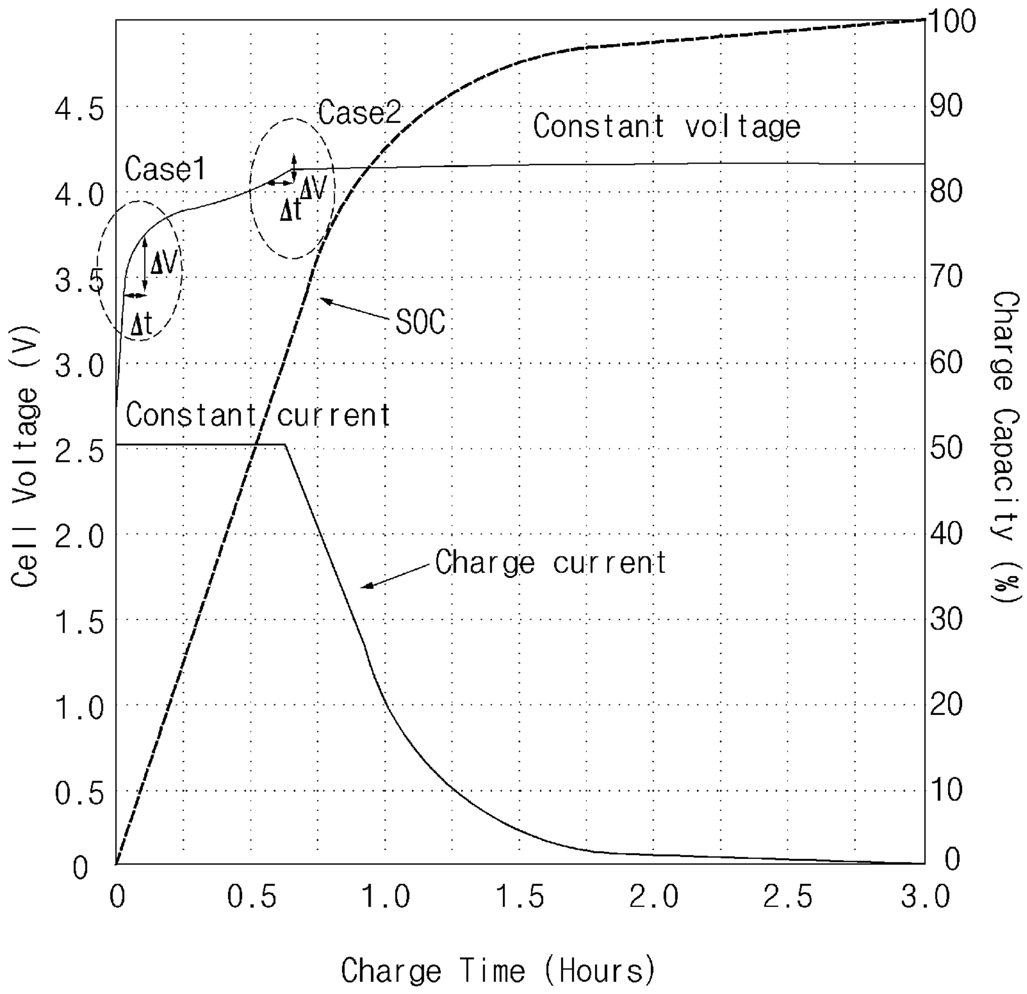
FIG. 4 is a graph schematically illustrating a voltage change according to the SOC of a battery.

FIG. 4 is a graph schematically illustrating a voltage change according to the SOC of a battery.

As shown in FIG. 4, when the change in battery voltage with time is large, it may be confirmed that the SOC of the battery is in a low discharged state. In addition, when the change in voltage of the battery with time is small, it may be confirmed that the SOC of the battery is in a high charged state.

The controller 130 may determine that the battery is in a discharged state when it is determined that the amount of change in the battery voltage exceeds the reference value in consideration of the characteristic that the amount of change in the battery voltage varies according to the SOC of the battery. The controller 130 may determine that the battery is in a charged state when it is determined that the amount of change in the battery voltage does not exceed the reference value.

Referring to FIG. 4, when it is determined that the measured voltage value of the battery to which the reference current is input exceeds the first threshold value and is less than the second threshold value and the amount of change in the battery voltage exceeds the reference value, because the battery is in a discharged state, the controller 130 may determine that the battery of the second mobility is discharged to have a voltage that exceeds the first threshold value and is less than the second threshold value. Accordingly, in case of a discharged state, the controller 130 may determine the rated voltage of the battery having a voltage exceeding the first threshold value and less than the second threshold value.

In addition, when it is determined that the measured voltage value of the battery to which the reference current is input exceeds the first threshold value and is less than the second threshold value and the amount of change in the battery voltage does not exceed the reference value, because the battery is in a charged state, the controller 130 may determine that the battery of the first mobility is charged to have a voltage that exceeds the first threshold value and is less than the second threshold value. Accordingly, in case of a charged state, the controller 130 may determine the rated voltage of the battery having a voltage exceeding the first threshold value and less than the second threshold value.

Figure 5:
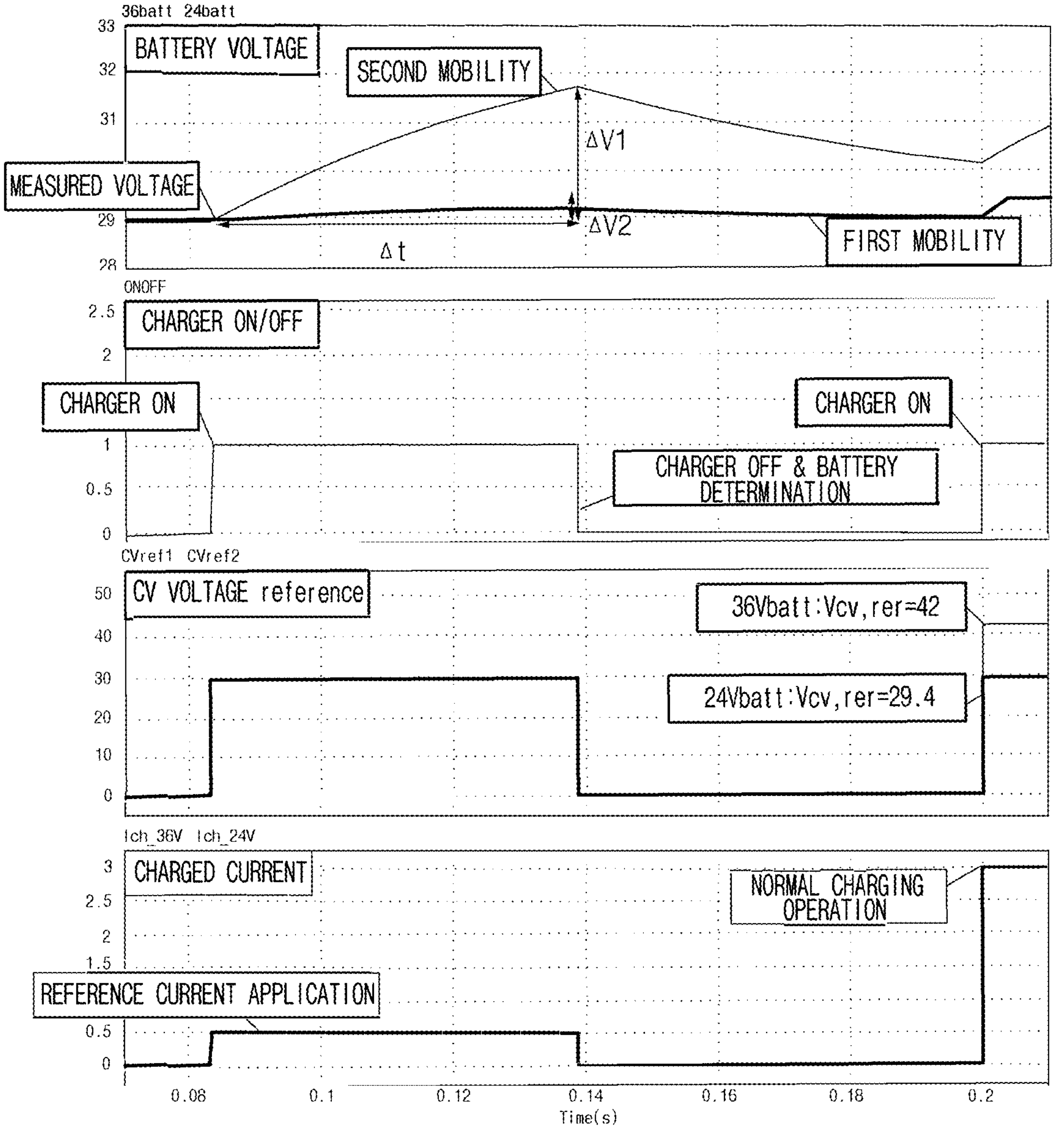
FIGS. 5 and 6 are graphs illustrating changes in battery voltage of mobilities according to an operation of an embodiment of the present disclosure.
Figure 6:
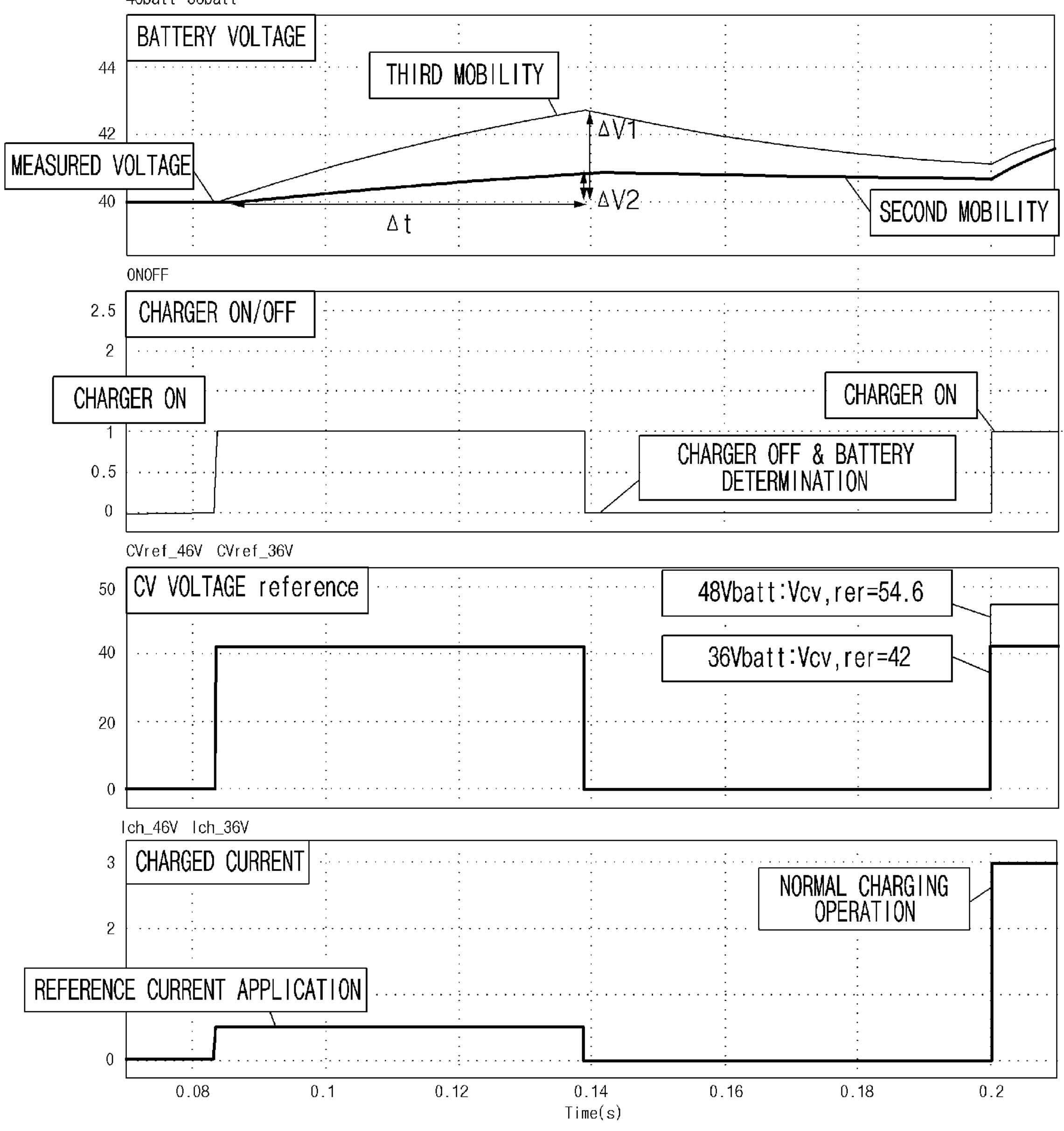

FIGS. 5 and 6 are graphs illustrating changes in battery voltage of mobilities according to an operation of an embodiment of the present disclosure.

As shown in FIG. 5, when it is determined that the voltage of the battery measured after being connected to the battery of a mobility exceeds the first threshold value and is less than the second threshold value and the amount of change in voltage does not exceed the first reference value, the controller 130 may determine that the battery of the mobility is in a fully charged state at a voltage value which exceeds the first threshold value and is less than the second threshold value, and may determine the rated voltage of the mobility (first mobility).

According to an embodiment, when it is determined that the measured voltage of the battery is about 29 V and the amount of change in voltage does not exceed the first reference value, because the battery is in a fully charged state at about 29 V, the controller 130 may determine the rated voltage of the mobility (first mobility) as about 24 V.

When it is determined that the rated voltage of the mobility (first mobility) is about 24 V, the controller 130 may set the charging voltage corresponding to the rated voltage. In this case, the charging voltage may include a preset voltage to prevent the battery of the mobility from being overcharged. For example, when it is determined that the rated voltage of the mobility (first mobility) is 24V, the controller 130 may set the charging voltage to 29.4 V. Accordingly, the controller 130 may control charging of the mobility (first mobility) without overcharging.

Meanwhile, when it is determined that the voltage of the battery measured after being connected to the battery of the mobility exceeds the first threshold value and is less than the second threshold value and the amount of change in voltage exceeds the first reference value, the controller 130 may determine that the battery of the mobility is in a discharged state at a voltage value which exceeds the first threshold value and is less than the second threshold value, and may determine the rated voltage of the mobility (second mobility).

According to an embodiment, when it is determined that the measured voltage of the battery is about 29 V and the amount of change in voltage exceeds the first reference value, because the battery is in a discharged state at about 29 V, the controller 130 may determine the rated voltage of the mobility (second mobility) as about 36 V.

When it is determined that the rated voltage of the mobility (second mobility) is about 36 V, the controller 130 may set the charging voltage corresponding to the rated voltage. In this case, the charging voltage may include a preset voltage to prevent the battery of the mobility from being overcharged. For example, when it is determined that the rated voltage of the mobility is 36 V, the controller 130 may set the charging voltage to 42 V. Accordingly, the controller 130 may control charging of the mobility (first mobility) without overcharging.

As shown in FIG. 6, when it is determined that the voltage of the battery measured after being connected to the battery of the mobility exceeds the third threshold value and is less than the fourth threshold value and the amount of change in voltage does not exceed the reference value, the controller 130 may determine that the battery of the mobility is in a fully charged state at a voltage value which exceeds the third threshold value and is less than the fourth threshold value, and may determine the rated voltage of the mobility (second mobility).

According to an embodiment, when it is determined that the measured voltage of the battery is about 40 V and the amount of change in voltage does not exceed the second reference value, because the battery is in a fully charged state at about 40 V, the controller 130 may determine the rated voltage of the mobility (second mobility) as about 36 V.

When it is determined that the rated voltage of the mobility (second mobility) is about 36 V, the controller 130 may set the charging voltage corresponding to the rated voltage. In this case, the charging voltage may include a preset voltage to prevent the battery of the mobility from being overcharged. For example, when it is determined that the rated voltage of the mobility is 36 V, the controller 130 may set the charging voltage to 42 V. Accordingly, the controller 130 may control charging of the mobility (second mobility) without overcharging.

Meanwhile, when it is determined that the voltage of the battery measured after being connected to the battery of the mobility exceeds the third threshold value and is less than the fourth threshold value and the amount of change in voltage exceeds the second reference value, the controller 130 may determine that the battery of the mobility is in a discharged state at a voltage value which exceeds the third threshold value and is less than the fourth threshold value and may determine the rated voltage of the mobility (third mobility).

According to an embodiment, when it is determined that the measured voltage of the battery is about 42 V and the amount of change in voltage exceeds the reference value, because the battery is in a discharged state at about 42 V, the controller 130 may determine the rated voltage of the mobility (third mobility) as about 48 V.

When it is determined that the rated voltage of the mobility (third mobility) is about 48 V, the controller 130 may set the charging voltage corresponding to the rated voltage. In this case, the charging voltage may include a preset voltage to prevent the battery of the mobility from being overcharged. For example, when it is determined that the rated voltage of the mobility is 48 V, the controller 130 may set the charging voltage to 54 V. Accordingly, the controller 130 may control charging of the mobility (third mobility) without overcharging.

According to an embodiment, the controller 130 may control wireless or wired charging of the battery.

Figure 7:
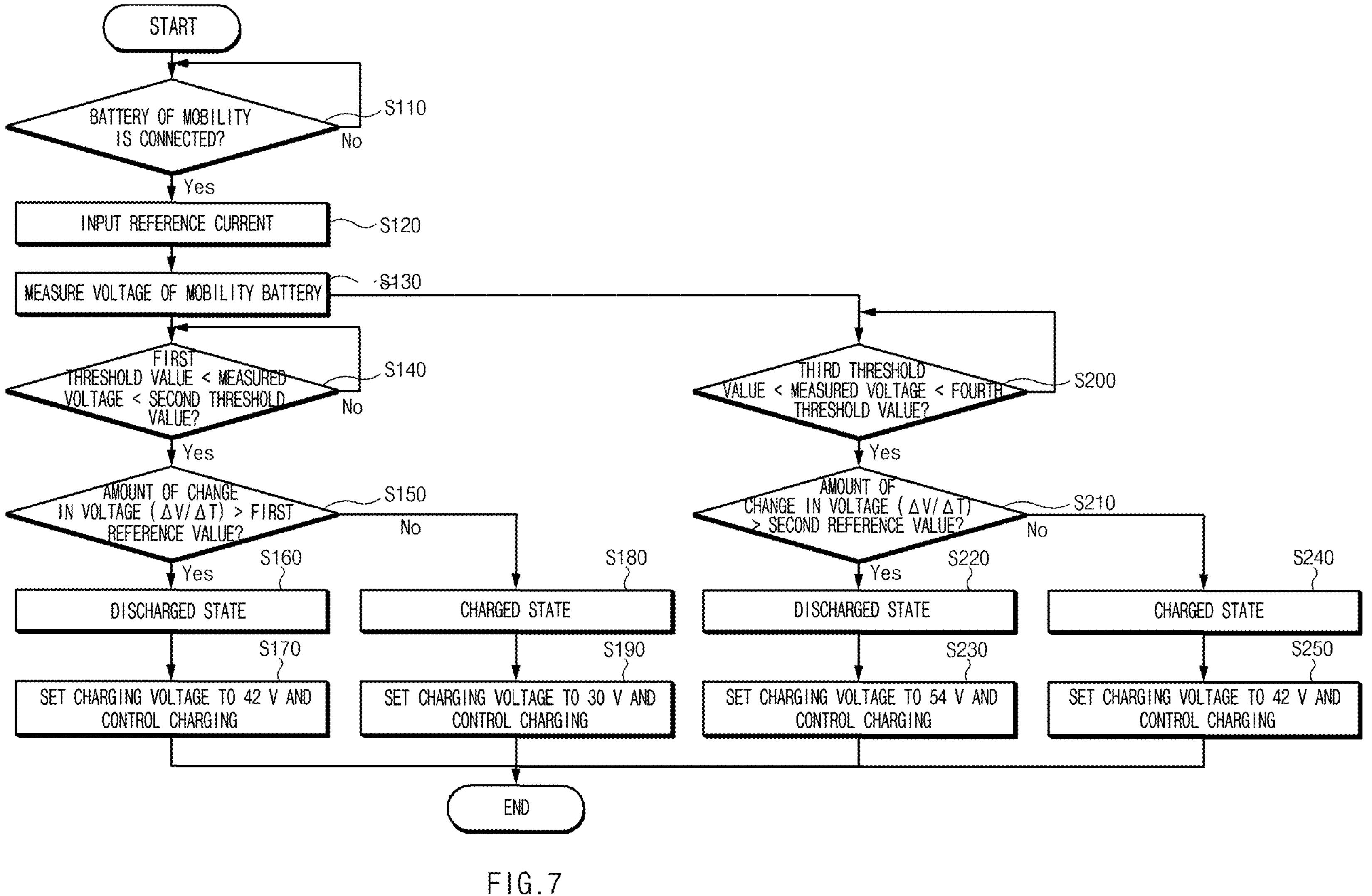
FIG. 7 is a flowchart illustrating a method of controlling charging of mobilities according to an embodiment of the present disclosure.

FIG. 7 is a flowchart illustrating a method of controlling charging of a mobility according to an embodiment of the present disclosure.

As shown in FIG. 7, in Silo, the controller 130 may determine whether the battery of the mobility is connected.

In this case, the connection of the battery of the mobility may include a wireless connection or a wired connection.

When it is determined that the battery of the mobility is connected, in S120, the controller 130 may control a reference current to be input to the battery. In this case, the reference current may mean a current having a value less than the current required for charging the battery. According to an embodiment, the reference current may include a minute current of 0.5 A.

In S130, the controller 130 may control the sensor no to measure the voltage of a battery to which a reference current is input.

In S140, the controller 130 may determine whether the voltage of the battery exceeds the first threshold value and is less than the second threshold value.

According to an embodiment, in S140, the controller 130 may calculate the cross voltage between the voltage distribution of the first mobility and the voltage distribution of the second mobility adjacent to the voltage distribution of the first mobility, set the minimum value in a specified range including the cross voltage as the first threshold value, and set the maximum value in the specified range as the second threshold value. For a more detailed description, refer to FIG. 2.

According to an embodiment, when the rated voltage of the first mobility is 24 V, the controller 130 may set the voltage distribution “A” of the first mobility to the first range (e.g., 22 V to 32 V). In addition, when the rated voltage of the second mobility is 36 V, the controller 130 may set the voltage distribution “B” of the second mobility to the second range (e.g., 32 V to 42 V). In addition, when the rated voltage of the third mobility is 48 V, the controller 130 may set the voltage distribution “C” of the third mobility to a third range (e.g., 42 V to 56 V).

The controller 130 may calculate the cross voltage between the voltage distribution “A” of the first mobility and the voltage distribution “B” of the second mobility having a voltage distribution adjacent to the voltage distribution “A” of the first mobility. According to an embodiment, the cross voltage between the voltage distribution “A” of the first mobility and the voltage distribution “B” of the second mobility may be calculated as about 32 V.

The controller 130 may set a specified range including the cross voltage and may set the minimum value in a specified range as the first threshold value (e.g., 31V) and the maximum value in the specified range as the second threshold value (e.g., 33 V).

When it is determined in S140 that the measured voltage value of the battery to which the reference current is input exceeds the first threshold value and is less than the second threshold value, in S150, the controller 130 determines whether the amount of change in the battery voltage exceeds the first reference value.

When it is determined in S150 that the amount of change in the battery voltage exceeds the first reference value in consideration of the characteristic that the amount of change in the battery voltage varies according to the SOC of the battery, in S160, the controller 130 may determine that the battery is in a discharged state.

When it is determined that the measured voltage value of the battery to which the reference current is input exceeds the first threshold value and is less than the second threshold value and the amount of change in the battery voltage exceeds the first reference value, because the battery is in a discharged state, in S160, the controller 130 may determine that the battery of the second mobility is discharged to have a voltage that exceeds the first threshold value and is less than the second threshold value. Accordingly, in case of a discharged state, the controller 130 may determine the rated voltage of the battery having a voltage exceeding the first threshold value and less than the second threshold value.

As an example, when it is determined that the measured (sensed) voltage of the battery is about 32 V and the amount of change in voltage exceeds the first reference value, because the battery is in a discharged state at about 32 V, the controller 130 may determine the rated voltage of the second mobility as about 36 V.

When the rated voltage of the second mobility is determined, in S170, the controller 130 may set the charging voltage corresponding to the rated voltage. In this case, the charging voltage may include a preset voltage to prevent the battery of the mobility from being overcharged.

For example, when it is determined in S170 that the rated voltage of the second mobility is 36 V, the controller 130 may set the charging voltage to 42 V. Accordingly, the controller 130 may control charging of the second mobility without overcharging.

Meanwhile, when it is determined in S150 that the amount of change in the battery voltage does not exceed the reference value, in S180, the controller 130 may determine that the battery is in a charged state.

In S180, when it is determined that the measured voltage value of the battery to which the reference current is input exceeds the first threshold value and is less than the second threshold value and the amount of change in the battery voltage does not exceed the first reference value, because the battery is in a charged state, the controller 130 may determine that the battery of the first mobility is charged to have a voltage that exceeds the first threshold value and is less than the second threshold value. Accordingly, in case of a charged state, the controller 130 may determine the rated voltage of the battery having a voltage exceeding the first threshold value and less than the second threshold value.

When it is determined in S140 that the measured (sensed) voltage of the battery is about 32 V and it is determined in S150 that the amount of change in voltage does not exceed the first reference value, because the battery is in a fully charged state at about 32 V, the controller 130 may determine the rated voltage of the first mobility as about 24 V.

When the rated voltage of the first mobility is determined, in S190, the controller 130 may set the charging voltage corresponding to the rated voltage. In this case, the charging voltage may include a preset voltage to prevent the battery of the mobility from being overcharged.

For example, when it is determined in S190 that the rated voltage of the first mobility is 24V, the controller 130 may set the charging voltage to 3*o* V. Accordingly, the controller 130 may control charging of the first mobility without overcharging.

According to an embodiment, in S170 and S190, the controller 130 may control wireless or wired charging of the battery.

According to another embodiment, the controller 130 may calculate the cross voltage between the voltage distribution “B” of the second mobility and the voltage distribution “C” of the third mobility having a voltage distribution adjacent to the voltage distribution “B” of the second mobility. According to an embodiment, the cross voltage between the voltage distribution “B” of the second mobility and the voltage distribution “C” of the third mobility may be calculated as about 42 V.

The controller 130 may set a specified range including the cross voltage and may set the minimum value in a specified range as the third threshold value (e.g., 41 V) and the maximum value in the specified range as the fourth threshold value (e.g., 43 V).

In S200, the controller 130 may determine whether the measured voltage value of the battery to which the reference current is input exceeds the third threshold value and is less than the fourth threshold value.

When it is determined in S200 that the measured voltage value of the battery to which the reference current is input exceeds the third threshold value and is less than the fourth threshold value, in S210, the controller 130 determines whether the amount of change in the battery voltage exceeds the second reference value.

When it is determined in S210 that the amount of change in the battery voltage exceeds the second reference value in consideration of the characteristic that the amount of change in the battery voltage varies according to the SOC of the battery, in S220, the controller 130 may determine that the battery is in a discharged state.

When it is determined in S210 that the measured voltage value of the battery to which the reference current is input exceeds the third threshold value and is less than the fourth threshold value and it is determined in S220 that the amount of change in the battery voltage exceeds the second reference value, because the battery is in a discharged state, the controller 130 may determine that the battery of the second mobility is discharged to have a voltage that exceeds the third threshold value and is less than the fourth threshold value. Accordingly, in case of a discharged state, the controller 130 may determine the rated voltage of the battery having a voltage exceeding the third threshold value and less than the fourth threshold value.

As an example, when it is determined that the measured (sensed) voltage of the battery is about 42 V and the amount of change in voltage exceeds the second reference value, because the battery is in a discharged state at about 42 V, the controller 130 may determine the rated voltage of the third mobility as about 48 V.

When the rated voltage of the third mobility is determined, in S**23*o*, the controller 130** may set the charging voltage corresponding to the rated voltage. In this case, the charging voltage may include a preset voltage to prevent the battery of the mobility from being overcharged.

For example, when it is determined in S230 that the rated voltage of the third mobility is 48 V, the controller 130 may set the charging voltage to 54 V. Accordingly, the controller 130 may control charging of the second mobility without overcharging.

Meanwhile, when it is determined in S210 that the amount of change in the battery voltage does not exceed the second reference value, in S240, the controller 130 may determine that the battery is in a charged state.

In S200, when it is determined that the measured voltage value of the battery to which the reference current is input exceeds the third threshold value and is less than the fourth threshold value, and it is determined in S210 that the amount of change in the battery voltage does not exceed the second reference value, because the battery is in a charged state, the controller 130 may determine that the battery of the second mobility is charged to have a voltage that exceeds the third threshold value and is less than the fourth threshold value. Accordingly, in case of a charged state, the controller 130 may determine the rated voltage of the battery having a voltage exceeding the third threshold value and less than the fourth threshold value.

When it is determined in S240 that the measured (sensed) voltage of the battery is about 42 V and it is determined in S210 that the amount of change in voltage does not exceed the second reference value, because the battery is in a fully charged state at about 42 V, the controller 130 may determine the rated voltage of the second mobility as about 36 V.

When the rated voltage of the second mobility is determined, in S250, the controller 130 may set the charging voltage corresponding to the rated voltage. In this case, the charging voltage may include a preset voltage to prevent the battery of the mobility from being overcharged.

For example, when it is determined in S**25*o* that the rated voltage of the second mobility is 36 V, the controller 130 may set the charging voltage to 42 V. Accordingly, the controller 130** may control charging of the second mobility without overcharging.

According to an embodiment, in **823*o* and S25*o*, the controller 130** may control wireless or wired charging of the battery.

Figure 8:
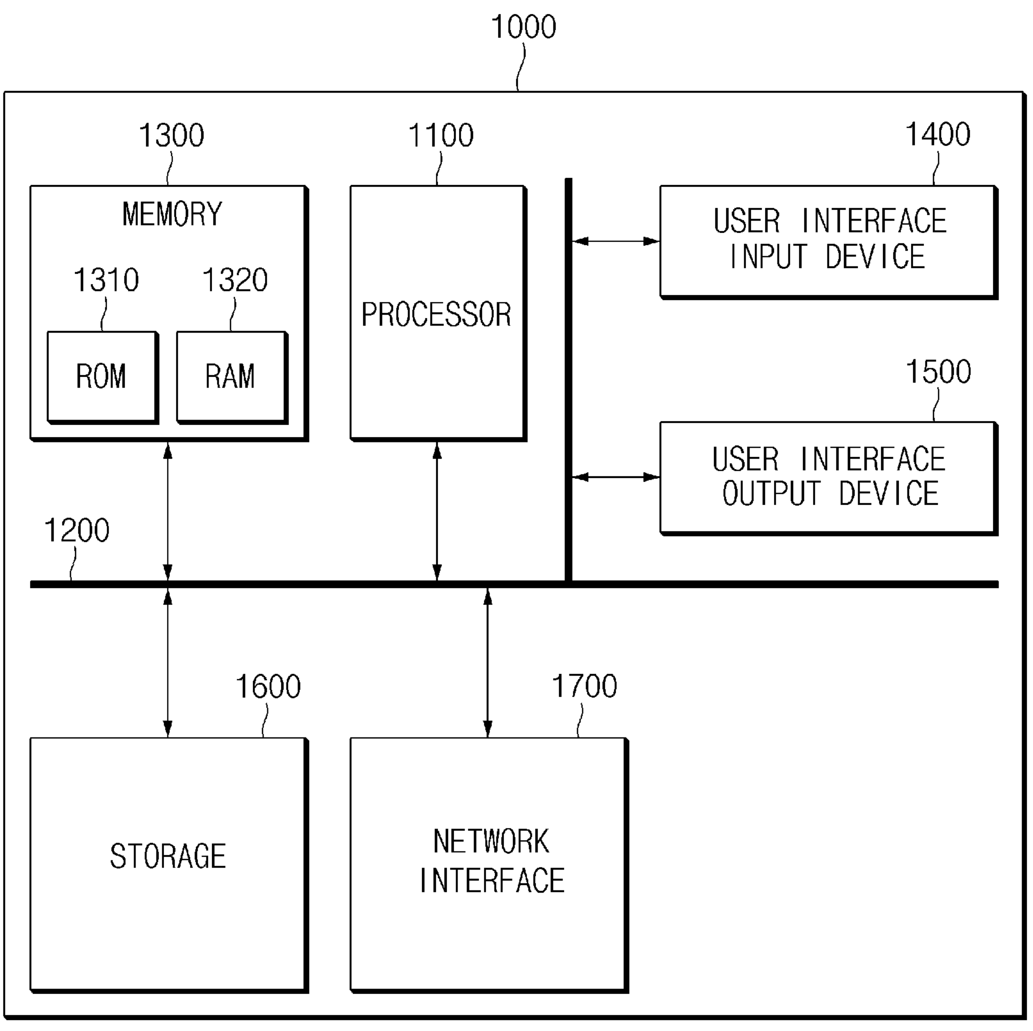
FIG. 8 is a block diagram illustrating a computing system according to an embodiment of the present disclosure.

FIG. 8 is a block diagram illustrating a computing system according to an embodiment of the present disclosure.

Referring to FIG. 8, a computing system woo may include at least one processor 1100, a memory 1300, a user interface input device 1400, a user interface output device 1500, a memory (i.e., a storage) 1600, and a network interface 1700 connected through a bus 1200.

The processor 1100 may be a central processing device (CPU) or a semiconductor device that processes instructions stored in the memory 1300 and/or the memory 1600. The memory 1300 and the memory 1600 may include various types of volatile or non-volatile storage media. For example, the memory 1300 may include a ROM (Read Only Memory) 1310 and a RAM (Random Access Memory) 1320.

Accordingly, the processes of the method or algorithm described in relation to the embodiments of the present disclosure may be implemented directly by hardware executed by the processor 1100, a software module, or a combination thereof. The software module may reside in a storage medium (that is, the memory 1300 and/or the memory 1600), such as a RAM, a flash memory, a ROM, an EPROM, an EEPROM, a register, a hard disk, a solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

According to the embodiments of the present disclosure, the apparatus and method for controlling charging of a mobility enable the charger to safely charge the battery by determining the rated voltage of the battery without separate communication with the mobility.

Although exemplary embodiments of the present disclosure have been described for illustrative purposes, those skilled in the art will appreciate that various modifications, additions, and substitutions are possible, without departing from the scope and spirit of the disclosure.

Therefore, the exemplary embodiments disclosed in the present disclosure are provided for the sake of descriptions, not limiting the technical concepts of the present disclosure, and it should be understood that such exemplary embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. An apparatus for controlling charging of a mobility, the apparatus comprising:

a sensor configured to measure a battery voltage of a battery of the mobility to which a reference current is input; and a controller configured to:

determine a rated voltage of the battery according to whether an amount of change in the battery voltage exceeds a reference value; and set a charging voltage corresponding to the rated voltage based on a determination that the battery voltage exceeds a first threshold value and is less than a second threshold value.

2. The apparatus of claim 1, wherein the controller is configured to determine that the battery having the rated voltage exceeding the second threshold value is in a discharged state based on a determination that the amount of change in the battery voltage exceeds the reference value.

3. The apparatus of claim 1, wherein the controller is configured to determine that the battery having the rated voltage less than the first threshold value is in a charged state based on a determination that the amount of change in the battery voltage does not exceed the reference value.

4. The apparatus of claim 1, wherein the controller is configured to:

calculate a cross voltage between a first voltage distribution of a first mobility and a second voltage distribution of a second mobility adjacent to the first voltage distribution of the first mobility;

set a minimum value in a specified range including the cross voltage as the first threshold value; and set a maximum value in the specified range as the second threshold value.

5. The apparatus of claim 4, wherein the first voltage distribution of the first mobility is set according to a range in which the rated voltage of the battery of the first mobility varies according to an external temperature, a lifespan of the battery of the first mobility, a charge amount of the battery of the first mobility, or a combination thereof.

6. The apparatus of claim 4, wherein the second voltage distribution of the second mobility is set according to a range in which the rated voltage of the battery of the second mobility varies according to an external temperature, a lifespan of the battery of the second mobility, a charge amount of the battery of the second mobility, or a combination thereof.

7. The apparatus of claim 1, wherein the reference current has a value less than a current required for charging the battery.

8. The apparatus of claim 1, wherein the controller is configured to set a preset voltage to the charging voltage to prevent the battery from being overcharged.

9. The apparatus of claim 1, wherein the controller is configured to control charging of the battery based on the charging voltage.

10. The apparatus of claim 1, wherein the mobility includes a device that is movable by power generated by electric power output from the battery.

11. A method of controlling charging of a mobility, the method comprising:

measuring a battery voltage of a battery of the mobility to which a reference current is input; and determining a rated voltage of the battery according to whether an amount of change in the battery voltage exceeds a reference value and setting a charging voltage corresponding to the rated voltage when determining that the battery voltage exceeds a first threshold value and is less than a second threshold value.

12. The method of claim 11, further comprising determining that the battery having the rated voltage exceeding the second threshold value is in a discharged state when it is determined that the amount of change in the battery voltage exceeds the reference value.

13. The method of claim 11, further comprising determining that the battery having the rated voltage less than the first threshold value is in a charged state when it is determined that the amount of change in the battery voltage does not exceed the reference value.

14. The method of claim 11, further comprising:

calculating a cross voltage between a first voltage distribution of a first mobility and a second voltage distribution of a second mobility adjacent to the first voltage distribution of the first mobility;

setting a minimum value in a specified range including the cross voltage as the first threshold value; and setting a maximum value in the specified range as the second threshold value.

15. The method of claim 14, further comprising setting the first voltage distribution of the first mobility according to a range in which the rated voltage of the battery of the first mobility varies according to an external temperature, a lifespan of the battery of the first mobility, a charge amount of the battery of the first mobility, or a combination thereof.

16. The method of claim 14, further comprising setting the second voltage distribution of the second mobility according to a range in which the rated voltage of the battery of the second mobility varies according to an external temperature, a lifespan of the battery of the seond mobility, a charge amount of the battery of the second mobility, or a combination thereof.

17. The method of claim 11, wherein the reference current has a value less than a current required for charging the battery.

18. The method of claim 11, further comprising setting a preset voltage as the charging voltage to prevent the battery from being overcharged.

19. The method of claim 11, further comprising controlling charging of the battery based on the charging voltage.

20. The method of claim 11, wherein the mobility includes a device that is moved by power generated by electric power output from the battery.

* * * * *